United States Patent [19]

Johansson et al.

[11] Patent Number: 5,534,696
[45] Date of Patent: Jul. 9, 1996

[54] SIGHT

[75] Inventors: Stefan Johansson, Lidingö; Unto Sandström, Johanneshov, both of Sweden

[73] Assignee: CelsiusTech Electronics AB, Jarfalla, Sweden

[21] Appl. No.: 353,275

[22] Filed: Dec. 5, 1994

[30] Foreign Application Priority Data

Dec. 16, 1993 [SE] Sweden .................................. 9304178

[51] Int. Cl.⁶ .................................................... G01J 5/00
[52] U.S. Cl. ............................................ 250/330; 250/334
[58] Field of Search ........................................ 250/330, 334

[56] References Cited

U.S. PATENT DOCUMENTS 4,475,039  10/1984  Christiansen et al ................. 250/334
5,133,605   7/1992  Nakamura .............................. 374/124

Primary Examiner—Constantine Hannaher
Attorney, Agent, or Firm—Pollock, Vande Sande & Priddy

[57] ABSTRACT

A sight apparatus has a day-sight part, a night-sight part and a filter which quenches the visible light so that the night-sight part in the form of an IR sight can be used during the daytime as well. In order to improve use of the night-sight under daylight conditions the filter has characteristics which quench visible light having wavelengths outside the wavelengths of blue light and is arranged in the beam path for the incoming visible light.

9 Claims, 1 Drawing Sheet

SIGHT

FIELD OF THE INVENTION

The present invention relates to a sight comprising an IR camera which converts thermal radiation which is coming in towards the opening of the IR camera into a visible image, a sight part for incoming visible light, and means for guiding the image generated by the IR camera into the beampath for the incoming visible light.

BACKGROUND OF THE INVENTION

By means of supplementing the sight part for incoming visible light, the so-called day sight, with an IR camera, a sight is obtained which can also be used in the dark and in bad weather, a so-called night sight. The invisible thermal radiation from the terrain is converted into an image which is visible to the eye. The image is reflected into the day sight using a beam splitter.

Under normal daylight conditions, the daysight image is many times brighter than the image coming from the night sight and therefore completely dominates the image of the terrain which an observer sees. Under certain circumstances, however, it is of interest to be able to use the IR sight during daytime as well. In order to achieve this, it is known to introduce a filter, which in principle excludes all daylight, into the beam path for incoming visible light. When such a filter is present in the beam path, information about the terrain is obtained solely in the IR range.

SUMMARY OF THE INVENTION

The object of the present invention is to effect improved use of the night sight under daylight conditions. This is achieved by means of a sight which is characterized in that a filter with a filter characteristic which quenches visible light having wavelengths outside the wavelengths of blue light is arranged to be introduced into the beam path for the incoming visible light.

A filter with the filter characteristic in accordance with the preceding paragraph, and which is referred to as "blue filter" in the following description, quenches all visible light apart from blue light. When this filter is inserted into the beam path, the faint red image of the terrain which has been reflected in from the night sight is now also visible. There are many advantages in introducing a blue filter. Due to the fact that the day-sight image is still visible, even though with a strong blue tinge, a more detailed image of the surroundings is obtained, thereby facilitating the user's orientation in the terrain. At the same time, the superimposed IR image shows where warm objects, which can be of interest to the user, are present in the terrain ("hot-spot detection"). The day image facilitates identification of an object. Objects which are hidden behind vegetation, for example, are also revealed by the IR image. The effect is further intensified in the eye by means of the color contrast blue/red in the image containing a blue day-light image and a red IR image.

According to an advantageous embodiment, the filter consists of BG glass, such as BG-1, which has been found to have quenching properties within the wavelength range for visible light which are suitable in this context. The fact that the blue light is also somewhat quenched does not prevent the filter from being designed so that a blue image of the terrain is visible in the day sight.

According to another advantageous embodiment, the filter can be introduced pivotably into the beam path, and according to a further advantageous, alternative embodiment it can be introduced displaceably into the beam path. The latter two embodiments permit the observer to switch the filter in the sight, in a simple manner, between, on the one hand, day-sight function only and, on the other hand, a function combining IR sight and day sight for daylight conditions.

The invention will be described below in more detail with reference to the attached drawings in which

DETAILED DESCRIPTION OF THE PREFERRED EMBODIMENT(S)

Figure 1:
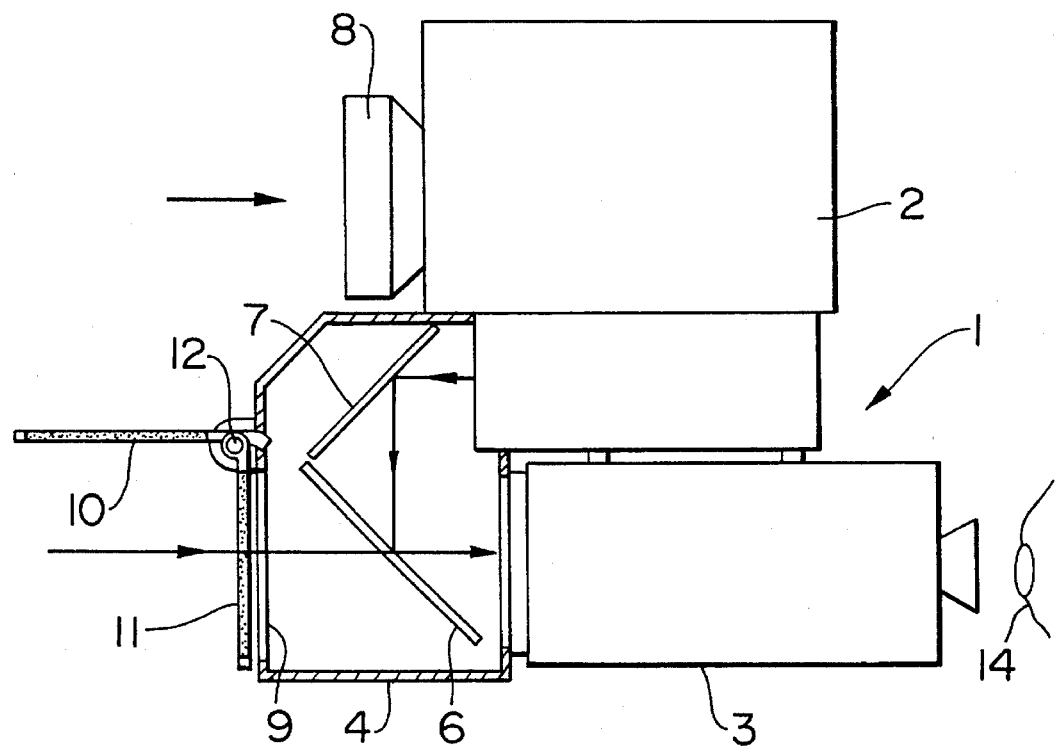
FIG. 1 shows a first embodiment, in a diagrammatic partially sectioned view, of a sight according to the invention having a filter which can be introduced pivotably.
Figure 2:
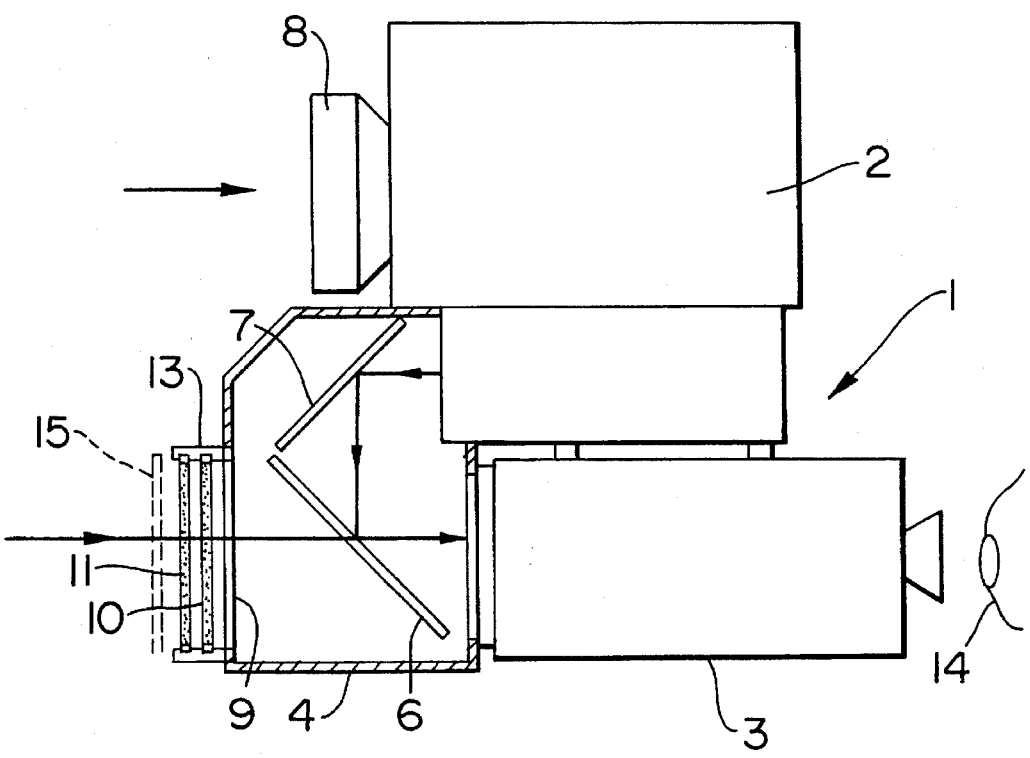
FIG. 2 shows a second diagrammatic embodiment, in a diagrammatic partially sectioned view, of a sight according to the invention having a filter which can be introduced displaceably.

The sight 1 which is shown comprises, in accordance with the embodiments shown in FIGS. 1 and 2, an IR camera 2, a sight part 3 for visible light and a connecting part 4 which couples the IR camera 2 and the sight part 3 together optically. In the IR camera, the invisible thermal radiation from the terrain which passes through the opening 8 of the camera is converted to a visible image. The image is generated by red light-emitting diodes (not shown) operating in a wavelength range around 650 nm. The IR camera operates with a 1:1 magnification, signifying that the converted IR image and the ordinary day image are of the same size. The image from the IR camera 2 is reflected into the sight part 3 by means of a number of optical components arranged in the connecting part 4. A beam splitter 6, preferably of the dichroic type, is included as an essential component in the connecting part 4. A plane mirror 7 reflects the converted IR image in towards the beam splitter 6 which, within the frequency range of the converted IR image, reflects the IR image towards the sight part 3. Visible light coming in towards the sight part 3 reaches, via an opening 9, the beam splitter 6, which transmits the light towards the sight part 3. The sight part 3 consists of a conventional day sight and will not be described in more detail here. Two filters 10, 11 are arranged in association with the opening 9 of the connecting part 4.

In accordance with FIG. 1, these two filters are arranged pivotably around an axle 12 in front of the opening 9 of the connecting part. The filter 10, shown in the raised position, is of the type which is known to be introduced into the beam path in order to quench daylight when using the IR sight during the daytime. The filter 11, shown in the lowered position, consists of a blue filter having the property of essentially transmitting blue light but suppressing remaining visible light. Three operational situations can be distinguished. When both the filters are in the raised position, the observer 14 is presented with a conventional day image. When both filters are in the lowered position, visible light is screened off and the observer 14 is presented solely with an IR image. When the filter 10 is raised and the filter 11 is lowered, a blue day-sight image is obtained which has a red night-sight image reflected into it.

In accordance with the embodiment shown in FIG. 2, the two filters 10, 11 can be displaceably introduced in front of the opening 9 of the connecting part. Guide rails 13 limit the movements of the filters. As was the case with the embodiment according to FIG. 1, the observer 14 can be presented with three different image types. The embodiment in accordance with FIG. 2 also permits the sequence of the filters in the beam path to be changed. As is indicated by the dashed lines 15 in FIG. 2, the blue filter can consist of several filter elements which can be introduced separately in front of the opening 9 of the connecting part 4. Such an arrangement increases the possibilities of varying the blue-filter quenching. In this context, each filter element which is included can be entirely responsible for the blue-filter quenching, or else a number of blue filter elements can be combined.

We claim:

1. A sight apparatus comprising:

an IR camera which converts thermal radiation coming in towards the opening of the IR camera into a visible image;

a sight part for incoming visible light;

means for guiding the image generated by the IR camera into the beam path for the incoming visible light; and at least one filter with a filter characteristic which quenches visible light having wavelengths outside the wavelengths of blue light, said filter being arranged to be introduced into the beam path for the incoming visible light whereby said blue light is transmitted along with said image generated by said IR camera towards said sight part.

2. A sight apparatus according to claim 1, wherein said filter consists of a so-called BG glass.

3. A sight apparatus according to claim 1, wherein said filter exhibits a filter characteristic having a first quenching level within the wavelength range for blue light and a second quenching level, which is much higher in relation to the first quenching level, for visible light outside the wavelengths of blue light.

4. A sight apparatus according to claim 1, wherein said filter is pivotably introduced into the beam path.

5. A sight apparatus according to claim 1, wherein said filter is displaceably introduced into the beam path.

6. A sight apparatus according to claim 1, wherein said filter includes a number of filter elements which can be introduced into the beam path for the incoming visible light.

7. A sight according to claim 6, wherein said filter elements are adapted to be separately introduced into the beam path.

8. A sight apparatus comprising:

an IR camera which converts thermal radiation coming in through the opening of the IR camera into a visible image;

a sight part for incoming visible light;

means for guiding the image generated by the IR camera into the beam path for the incoming visible light;

at least one filter with a filter characteristic which quenches visible light having wavelengths outside the wavelengths of blue light; and means for removably placing filter into the beam path for the incoming visible light, whereby said blue light can be transmitted along with said image generated by said IR camera towards said sight part.

9. A sight apparatus according to claim 8 further including another filter element adapted to be removably placed into the beam path for quenching visible daylight.

* * * * *